F. AND P. B. STREICH.
PROOFING APPARATUS.
APPLICATION FILED AUG. 13, 1918.
1,322,839.
Patented Nov. 25, 1919.
3 SHEETS—SHEET 2.
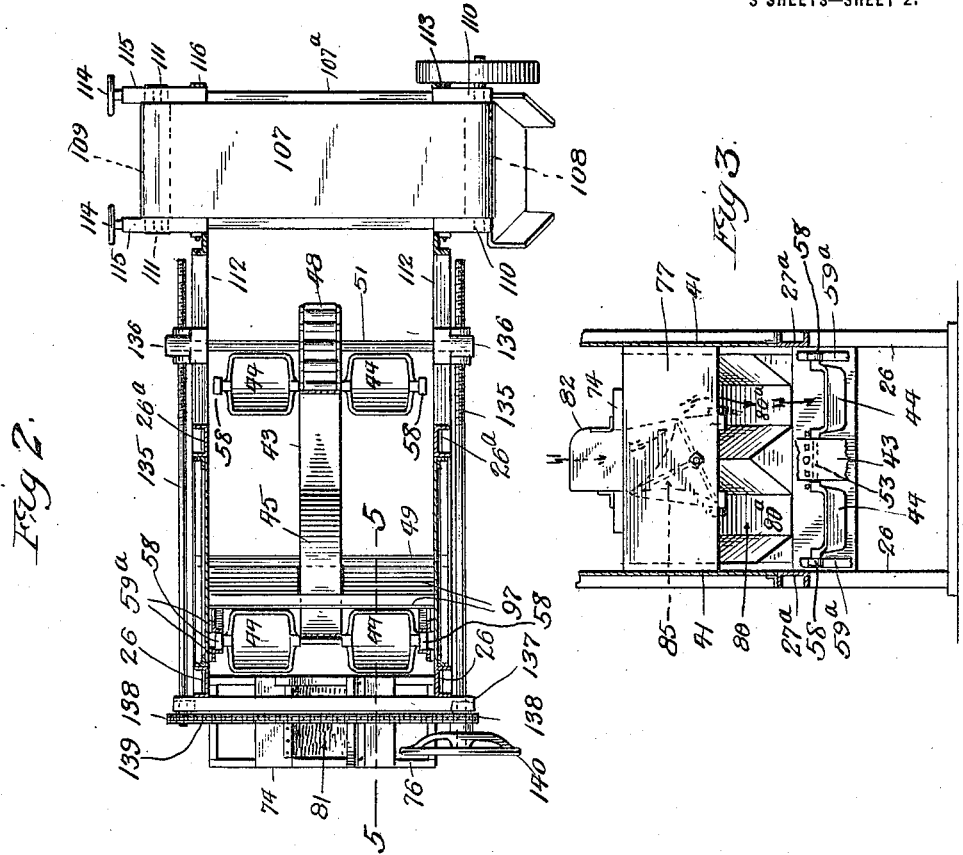
INVENTORS:
Frank Streich
Paul B. Streich
BY Charles O. Sherwey
ATTORNEY

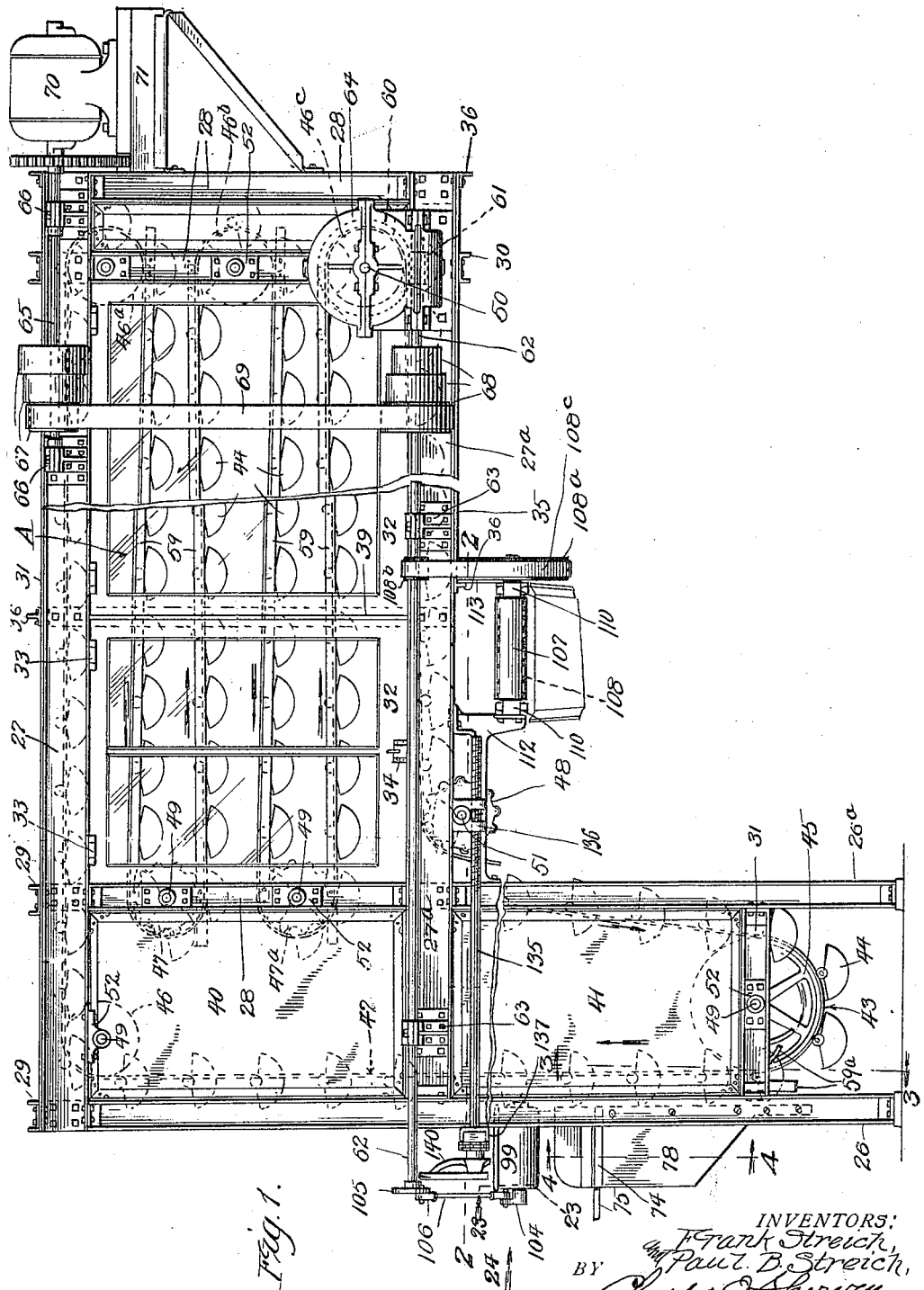

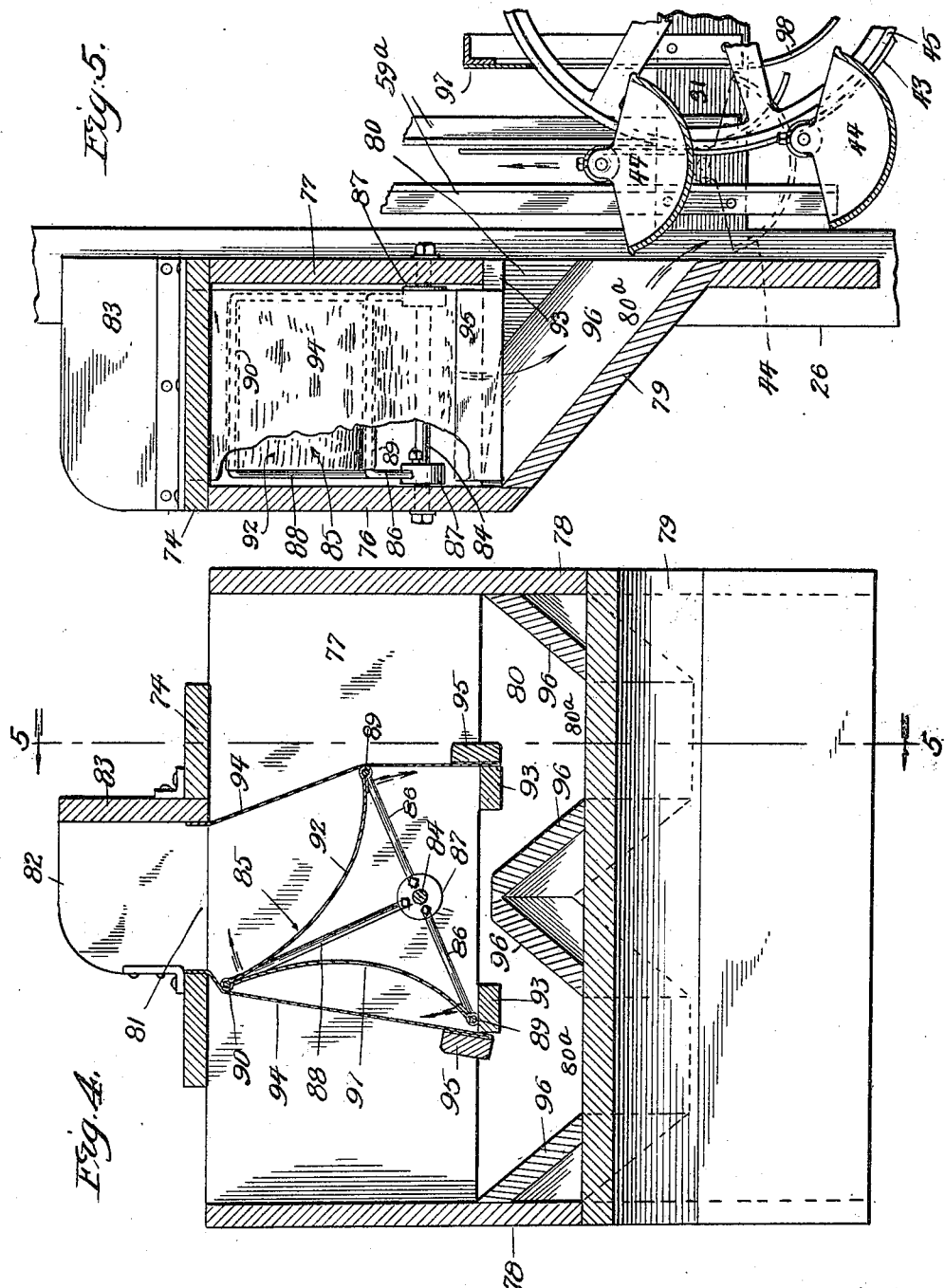

UNITED STATES PATENT OFFICE.

FRANK STREICH AND PAUL B. STREICH, OF JOLIET, ILLINOIS, ASSIGNORS TO THE UNION WRAPPING MACHINE COMPANY, OF JOLIET, ILLINOIS, A CORPORATION OF ILLINOIS.

PROOFING APPARATUS.

1,322,839.

Specification of Letters Patent.   Patented Nov. 25, 1919.

Application filed August 13, 1918.   Serial No. 249,646.

*To all whom it may concern:*

Be it known that we, FRANK STREICH, and PAUL B. STREICH, both citizens of the United States, and both residents of Joliet, county of Will, and State of Illinois, have invented certain new and useful Improvements in Proofing Apparatus, of which the following is declared to be a full, clear, and exact description.

This invention relates to bakers' automatic machinery, and more particularly to the proofing apparatus, and its principal object is to provide an apparatus, automatic in operation, for taking care of lumps of dough after they have been rounded up and before they are molded into loaves. As is well known to those skilled in the art of bakers' machinery, after the dough has been divided into lumps or loaves, the lumps are rounded up and the rounded up lumps are allowed to stand and given time to recuperate from the rounding up action, before they are molded into loaves. One of the objects of this invention is to provide an apparatus into which the lumps of dough are discharged from the rounding up machine, and conveyed through a proofing chamber for sufficient time to permit the dough to recuperate, after which the lumps of dough are automatically discharged from the apparatus upon a belt, which conveys them to the molding machine, or, they are discharged upon a table from which they may be taken and molded by hand. Other objects and advantages will appear in the course of the following specification and with all of said objects and advantages in view, this invention consists of the several novel features of construction, arrangement and combination of parts hereinafter fully set forth and claimed.

The invention is clearly illustrated in the drawings accompanying this specification, in which:

Figure 1 is a side elevation, partly broken away, of a proofing apparatus embodying a simple form of the present invention; Fig. 2 is a view, partly in plan and partly in horizontal section of the apparatus, the line section being indicated at 2—2 in Fig. 1, and a certain flour sieve being omitted from the view; Fig. 3 is a view, partly in end elevation and partly in vertical cross section of the apparatus, the line of section being indicated at 3—3 in Fig. 1; Fig. 4 is a detail view, partly in end elevation and partly in vertical cross section of the feeding apparatus, the line of section being indicated at 4—4 in Fig. 1, and Fig. 5 is a view, partly in side elevation and partly in vertical longitudinal section of the feeding apparatus, the line of section being indicated at 5—5 in Figs. 2 and 4.

Referring to said drawings, which illustrate a simple embodiment of the present invention, the reference characters 26, 26$^a$ designate upright frame members and 27, 27$^a$ designate horizontal, lengthwise extending, top and bottom side frame members which are secured to the upright members 26, 26$^a$. Other upright frame members 28, 39 connect the top and bottom frame members 27, 27$^a$, and horizontal, crosswise extending frame members 29, 30, 36 connect the side frame members 27, 27$^a$ at points along their length to make a rigid and substantial frame-work for the apparatus. Other short, lengthwise extending horizontal frame members 31, connect the upright members 26, 26$^a$, near their lower ends.

The frame members may be constructed of wood or metal as is desired, but we have here shown them as constructed of channel bars and T bars, secured together at their intersecting or meeting points by bolts or by angle irons, bolted or riveted to the frame members. The upright frame members 26, 26$^a$ act as supports for one end of the structure and support the proofing chamber (indicating by the reference A), at a place adjacent the ceiling of the room in which the apparatus is contained. In Fig. 1, a considerable portion of the upright part of the apparatus has been broken away and the major portion or horizontal portion of the proofing chamber has been broken away, in order that the view may be made as large as possible upon the sheet. A top or cover 31 is secured to the longitudinal frame members 27, and glazed doors or windows 32 are hinged upon the frame members 27, by hinges 33 and are provided on their lower ends with locks or latches 34 whereby they may be secured in place upon the frame. The ends of the proofing chamber may be closed by end walls. Bottom plates or doors 35 are hingedly secured to transverse T bars 36. Conveniently the vertical T bars 39, which are secured to the frame members 27, 27$^a$ space the doors or windows apart and divide the proofing chamber into a plurality of panels. The sides of the upright portion of the apparatus are closed by plates or panels 40, 41, secured to the channel bars by angle irons and are screwed or riveted to the plates and channel bars.

Extending through the apparatus is an endless conveyer belt 42, which may comprise a flexible belt 43, and dough carrying buckets 44. The belt is trained around pulleys 45, 46, 46ª, 47, 46ᵇ, 47ª, 46ᶜ and 48 as illustrated in Fig. 1, where it will be seen that in the proofing chamber, the conveyer is carried back and forth a number of times over the pulleys. The pulleys are mounted upon transversely extending shafts 49, 50 and 51, journaled in bearing boxes 52, 136 certain of which are secured to the frame members, 27, 28 and 31 respectively, and others (136), being adjustably mounted on brackets 112.

The buckets 44 are arranged in pairs (see Figs. 2—3), and are placed along each side of the conveyer belt 43 and pivotally secured thereto by short rods 53. Oppositely disposed ears are formed on the buckets and upon the outer ears are journaled rollers 58 that run upon oppositely disposed, lengthwise extending tracks 59, which are secured to the upright T irons 39 of the framework. In the upright portion of the apparatus are tracks 59ª (see Fig. 5), between which the rollers 58 travel in the upward movement of the conveyer. Said tracks 59ª prevent any swaying of the conveyer at this place. It will be observed that the buckets of each pair are rigidly connected together by the rods 53, each pair forming to all intents and purposes, a unitary structure, supported by tracks 59 while traveling between the pulleys in the proofing chamber. The conveyer forms the subject matter of a divisional application filed by us on Dec. 13, 1918; Serial No. 266,548, and it is fully described and illustrated in that application.

The conveyer may be driven by any suitable mechanism. Upon one end of the shaft 50 is a worm gear 60 which meshes with a worm pinion 61 fast upon a shaft 62, journaled in bearing brackets 63, secured to one of the lower frame members 27ª. Preferably the worm gear and pinion are inclosed in the housing 64, secured to one of the frame members 27ª. The shaft 62 is driven from a shaft 65, journaled in bearing brackets 66, secured to one of the upper frame members 27. In order to obtain several speeds for the conveyer, coned pulleys 67, 68 are provided upon the shafts 65, 62, which coned pulleys are connected by a belt 69. Conveniently, an electric motor 70 may be employed for driving the operating mechanism of the apparatus, which motor may be mounted upon a bracket 71 at one end of the apparatus, and said motor may be connected to drive the shaft 65 by suitable gearing. Obviously the shaft 65 may be driven from any suitable source of power.

The feeding apparatus, for feeding lumps of dough to the buckets, is secured to the upright supporting members 26 in position adjacent the path of upward travel of the conveyer buckets from the pulley 45 to the pulley 46. The top 74 of the feeding apparatus is located approximately on the level of the delivery table or chute 75 of the rounding up machine (not shown), whereby the rounding up machine may deliver the lumps of dough directly into the feeding apparatus.

As shown, said feeding apparatus has two side walls 76—77, two end walls 78, and an inclined bottom wall 79, extending from the side wall 76 to a point considerably below the bottom of lower edge of side wall 77, to leave a discharge opening 80 therebetween. A receiving opening 81, is formed in the top 74, and along two of its sides are upwardly extending members 82, 83, that act to prevent the lumps of dough from being thrown beyond the receiving opening 81. Said opening is centrally disposed with respect to the feeding receptacle and below said opening is a rock shaft 84 which is journaled in the side walls 76—77. Said rock shaft supports a distributing device 85, which operates to deliver lumps of dough alternatively to the buckets on each side of the conveyer belt. The distributing device comprises two oppositely disposed, radially extending U shaped frame members 86, secured in hubs 87, which are fast on the shaft 84, and a third radially extending U shaped frame member 88, secured in said hubs 87, and extending at right angles to frame members 86. To the cross bars 89—90 of the frame members 86—88, are secured flexible webs 91—92, which may be made of canvas or other like fabric, upon which the lumps of dough fall when delivered to the feeding mechanism. Said webs 91—92 extend between the side walls 76, 77. Below the shaft 84 are two bars 93, which extend between the side walls 76, 77 and are secured thereto. Said bars 93 are located in position to act as stops for the feed mechanism 85, thereby limiting its rocking movement in either direction. Flaps, comprising strips of flexible material, such as canvas or the like 94, are secured to the top 74 along the edges of opening 81, and extend between the side walls 76, 77, and have weights in the form of bars 95, secured to their lower ends and said flaps, act as brakes or retarding devices for the distributing device as the lumps of dough fall upon the webs 91, 92, and rock the distributing device, thereby preventing the delivery mechanism 85 from rebounding and delivering a second lump of dough into one and the same bucket. Inclined boards 96 are secured upon the inclined bottom 79, and with the inclined bottom 79, form two troughs or chutes 80ª, below the discharge sides of the distributing device 85, and said troughs or chutes are in line with the path of travel with the buckets, (see Fig. 3), and discharge the lumps of dough thereinto as will appear later on in the course of this specification.

Behind the discharge opening 80 is a guard 97 which is secured to the frame members 31. Said guard is in the form of a reinforced plate and extends vertically between the frame members 31. It is cut away at its middle portion to form an opening through which the pulley 45 rotates. The lower end 98 of the guard 97, is curved backward (as shown in Fig. 5), to permit the buckets to pass the lower end. Said guard acts to prevent the lumps of dough from being accidentally thrown out of the buckets when discharged into the same from the feeding mechanism.

Above the feeding mechanism is a flour sieve 99 which conveniently may be supported from the upright supporting members 26. A spring pressed stirrer (not shown) is provided in the sieve and is rocked by means, operated by the shaft 62. The means here shown for agitating the stirrer comprises a crank arm 104, fast on one end of the stirrer, a crank wheel 105 fast on the shaft 62 and a link connection 106, connecting said crank arm and crank wheel. Rotation of the shaft 62 imparts a rocking movement to the stirrer shaft and a consequent rocking movement of the stirrer.

Below the proofing chamber at a place adjacent the upright portion of the apparatus is a transversely extending conveyer belt 107, (see Figs. 1, and 2), which is trained around rollers 108, 109, journaled in bearing boxes 110, 111. One of the bearing boxes 110 is supported by the bracket 112, and the other bearing box 110 is supported by a bar 113, secured to the frame of the apparatus. Take up mechanism has provided for the bearing boxes 111, which take up mechanism may comprise screws 114, mounted in yoke shaped supports 115 and threaded in the bearing boxes 111. Between the bearing boxes 110 and yoke shaped supports 115, extends a board 107ª which is secured thereto. Upon the shaft of the roller 108, is a pulley 108ª which is driven from a pulley 108ᵇ on the shaft 62 by a belt pulley 108ᶜ. Above the conveyer belt 107, the bottom of the proofing chamber is left open, and at this point dumping mechanism (not shown) is provided for tilting the buckets as they pass the conveyer belt 107, to thereby discharge the lumps of dough upon the belt.

The dumping mechanism is not illustrated, but it is fully shown and described in a divisional application filed by us on December 13, 1918, Serial No. 266,549.

Obviously there is more or less stretch in the belt of the length used in this apparatus, and for this reason we have provided a belt tightener, which as shown comprises two screw threaded rods 135, (see Figs. 1 and 2) which are threaded in bearing boxes 136, which support the shaft 51 of the pulley 48. Said screw threaded rods 135 are mounted in bearing boxes carried by a frame member 137 secured to the upright frame members 26, and said rods 135 are connected to rotate in unison by sprocket wheels 138 on the rods and a sprocket chain 139 trained around said sprocket wheels. A hand wheel 140, mounted upon one of the rods 135 affords means for turning the rods to move the bearing boxes 136 lengthwise of the apparatus. Said bearing boxes 136 are guided to move between the lower edges of the side frame members 27ª, and the upper edges of the brackets 112. Said brackets 112 are secured to the upper end portions of the vertical frame members 26ª and adjacent end portions of the longitudinal frame members 27ª.

In the operation of the machine, the rounding up machine delivers the lumps of dough, one at a time to the feeding mechanism of the apparatus. The flour sieve above the feeding mechanism continuously sprinkles flour upon the distributing device. The rocking distributing device 85 normally stands in an inclined position, either in one shown in full line in Fig. 4 or in an inclined direction complemental to the one illustrated. As a lump of dough falls upon the flexible web 92, it tilts the distributing device over in the direction of the arrows (see Fig. 4) and, at the same time rubs against and forces outward the weighted retarding flap or curtain 94 and finally passes between the outer end of the distributing device and adjacent retarding flap, falling into the trough 80ª below, through which it rolls down and discharges into one of a pair of buckets, which at that time has reached a position illustrated by the lowermost bucket in Fig. 5. The distributing device 85 is left standing with the other web 91 in position to receive the next lump of dough and to discharge it into the other trough 80ª. The timing between the rounding up machine and proofing apparatus is such that when a subsequent lump of dough is delivered to the distributing device and rolls down the other trough, the pair of buckets into which the first lumps of dough was delivered, has moved upward until their upper edges are flush with or immediately below the discharge end of the troughs namely in position so that the other bucket of the pair will receive a lump of dough. In this manner it is impossible for the distributing device to deliver two lumps of dough into any one bucket, although if for some reason the rounding up machine does not deliver a lump of dough to the distributing device in time, one of the buckets might pass the discharge troughs without being loaded.

As the buckets are filled they continue to move upward, the belt passing over the pulleys 46, 46ª, 47, 46ᵇ, 47ª, 46ᶜ and 48, the rollers of the buckets running upon the tracks and supporting the buckets as they travel between the pulleys. It will be seen that in all cases the buckets are carried in a suspended condition until they reach the dumping mechanism, whereupon the buckets are tilted upward and backward discharging their contents upon the conveyer belt 107, which carries them forward and discharges them upon a chute from which they are delivered to the molding machine or to any other place as is desired.

The speed of the conveyer belt and consequent length of time that the lumps of dough are carried through the proofing chamber may be regulated by shifting the belt 69 along the coned pulleys 67—68. Three speeds are provided for which allow the buckets to remain in the proofing chamber from nine to fifteen minutes, or any other predetermined intervals.

The proofing chamber is located at the top of the apparatus in order that it may be suspended or supported nearer the ceiling of the bakery so as to utilize the heat usually present in bakeries. The doors or windows 32, being hingedly supported, they may be opened to ventilate the proofing chamber, or in case it becomes necessary to remove any lump of dough that may have been accidentally dropped from a bucket.

The apparatus is continuous in operation and requires very little attention, namely, the ordinary care and attention of an attendant to see that it is in working order. It is entirely automatic in operation, receiving the raw lumps of dough, carrying them through the proofing chamber and delivering them to the discharge conveyer belt.

More or less variation is possible of the exact details of construction shown and described. We desire, therefore, not to limit ourselves to the exact form of construction shown and described, but intend in the following claims to point out all of the invention disclosed herein.

We claim as new and desire to secure by Letters Patent:—

1. In an apparatus of the class described, a feeding mechanism comprising a housing having a receiving opening in its upper end and two downwardly inclined discharge troughs at its lower end, a rocking distributing device interposed between the receiving end and discharge troughs and having two flexible webs, one or the other of which alternately underlies the receiving opening and receives a lump of dough falling through said opening, said distributing device being rocked from side to side by the impact and weight of the dough falling upon the webs, stops limiting the rocking movement of the distributing device, and weighted flaps depending across the outer ends of said distributing device.

2. In an apparatus of the class described, a feeding device comprising a housing having a receiving opening in its upper end and two downwardly declined discharge troughs at its lower end, a rocking distributing device interposed between the receiving opening and discharge troughs and arranged to discharge lumps of dough, falling through said receiving opening, alternately into each discharge trough, stops limiting the rocking movement of said distributing device and weighted flaps engaging side edges of said distributing device and adapted to prevent rebounding of said distributing device when acted upon by a lump of dough falling upon it.

3. In an apparatus of the class described, a feeding device comprising a housing having a receiving opening in its upper end and two downwardly declined discharge troughs, a rocking distributing device interposed between the receiving opening and discharge troughs, said distributing device having woven fabric webs between its upper end and its two side edges, and being arranged to be rocked back and forth by lumps of dough falling upon said webs, the lumps of dough being thereby discharged alternately into the two troughs, and weighted woven fabric flaps secured to the upper end of device and depending across the side edges of said distributing device and operating to prevent rebounding thereof.

4. In an apparatus of the class described, a feeding device comprising a housing having a receiving opening in its upper end and two downwardly declined discharge troughs at its lower end, a rocking distributing device interposed between the receiving opening and discharge troughs and having two obliquely disposed woven fabric webs upon which lumps of dough fall when delivered through said receiving opening and weighted woven fabric flaps depending across the side edges of said distributing device and acting to prevent rebounding thereof.

5. In an apparatus of the class described, a feeding device comprising a housing, a receiving opening at the upper end thereof and two downwardly declined discharge troughs at the lower end thereof, a rocking distributing device interposed between the receiving opening and discharge troughs, comprising a shaft journaled in said housing, two oppositely disposed frame members secured to said shaft, a third frame member secured to said shaft at right angles to first named frame members and two woven fabric webs secured to the outer sides of said frame members, transverse strips arranged to limit the movement of said distributing device, and two weighted woven fabric flaps depending across the outer side edges of said first mentioned frame members, and adapted to prevent rebounding of the distributing device.

6. In a proofing apparatus, dough distributing mechanism having a single receiving opening and two discharge openings arranged side by side, and a rocking distributing device arranged between the receiving opening and the discharge openings and having two inclined sides upon which lumps of dough fall and rock the distributing device from side to side to discharge the dough alternately through the two discharge openings, and a traveling conveyer having buckets arranged side by side in pairs, arranged to travel past said discharge openings and receive the lumps of dough therefrom.

7. In a proofing apparatus, dough distributing mechanism having a single receiving opening and two discharge openings arranged side by side, and a rocking gravity operated distributing device arranged between the receiving opening and the discharge openings and having two inclined sides upon which lumps of dough fall and rock the distributing device from side to side to discharge the dough alternately through the two discharge openings, and a traveling conveyer having buckets arranged side by side in pairs, arranged to travel past said discharge openings and receive the lumps of dough therefrom.

8. In a proofing apparatus, dough distributing mechanism having a single receiving opening and two discharge openings arranged side by side, and a rocking distributing device arranged between the receiving opening and the discharge openings and having two inclined sides upon which lumps of dough fall and rock the distributing device from side to side to discharge the dough alternately through the two discharge openings, and an endless traveling conveyer having buckets hingedly secured thereto along its length, said buckets being arranged side by side in pairs and the buckets of each pair being adapted to receive a lump of dough as the pair of buckets pass the discharge openings.

In witness whereof, FRANK STREICH, has executed the above at Chicago, Cook county, Illinois, this 30th day of July A. D. 1918, and PAUL B. STREICH, has executed the above at Chicago, Cook county, Illinois, this 6th day of Aug. A. D. 1918.

FRANK STREICH.
PAUL B. STREICH.